United States Patent [19]

Ipsen

[11] 4,265,472
[45] May 5, 1981

[54] PIPE ELBOW CONNECTION

[75] Inventor: Peter G. Ipsen, Schenectady, N.Y.

[73] Assignee: General Electric Company, Schenectady, N.Y.

[21] Appl. No.: 69,327

[22] Filed: Aug. 24, 1979

[51] Int. Cl.³ .............................................. F16L 51/02
[52] U.S. Cl. ................................... 285/179; 285/228
[58] Field of Search ............... 285/228, 227, 179, 197, 285/DIG. 1

[56] References Cited

U.S. PATENT DOCUMENTS

| | | | |
|---|---|---|---|
| 3,198,558 | 8/1965 | Braden | 285/228 |
| 3,359,016 | 12/1967 | Sarlls, Jr. | 285/228 |
| 3,488,949 | 1/1970 | Jackson | 285/228 X |

FOREIGN PATENT DOCUMENTS 1200833  8/1970  United Kingdom ..................... 285/228

*Primary Examiner*—Thomas F. Callaghan
*Attorney, Agent, or Firm*—Lawrence D. Cutter; John F. Ahern

[57] ABSTRACT

The disclosure relates to the construction of large fluid conduits and particularly to steam conduits used in large power plants. In some power plants, steam is transferred from the exhaust of a higher pressure turbine section into the inlet of a lower pressure turbine section through a steam conduit sometimes referred to as a cross-over which may include several bellows type joints. If the turbine rotor speed exceeds rated speed, then it is desirable to limit the maximum speed to be attained by the turbine rotor. The present invention provides a reliable and advantageous construction which will decrease the maximum speed of a turbine rotor over designs now available in the prior art.

4 Claims, 1 Drawing Figure

STEAM FLOW

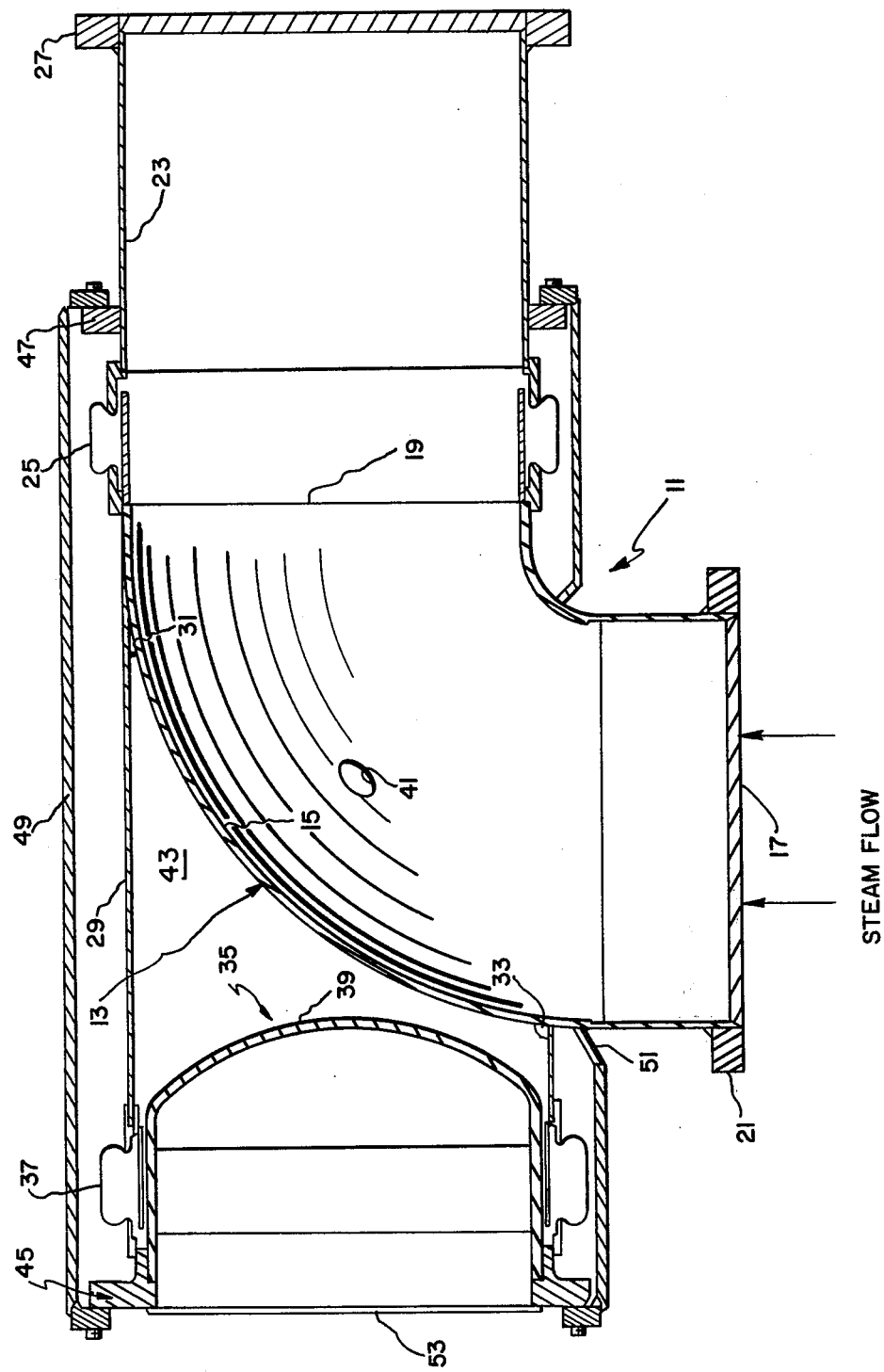

PIPE ELBOW CONNECTION

BACKGROUND OF THE INVENTION

This invention relates to fluid conduits in general and, in particular, to a steam conduit associated with a large steam turbine.

In some large power plants using steam turbines as prime movers, steam flows through several turbine sections having different pressure levels in decending order. For example, it is common to find a high pressure turbine section having its exhaust end connected to an intermediate pressure turbine section which may, in turn, be connected to one or more low pressure turbine sections. These turbine sections may all operate to rotate a single rotor. On the other hand, the turbine sections may have separate rotors and not necessarily be at different operating pressures. The present invention is directed to the transfer of fluid into a large rotating shaft machine downstream from a set of fluid control valves.

One criteria for the design of large rotating shaft prime movers is a limit on the maximum rotor speed which would occur upon sudden and complete loss of load. One factor which will determine the rotor maximum speed is the volume of steam or fluid which is stored in the fluid conduits downstream from the various turbine control valves.

Steam flow in a power plant occurs through large steam conduits which may shift in the axial direction because of pressure forces and thermal expansion. These large steam conduits sometimes are referred to as cross-overs. The pressure forces in large steam conduits are usually of such magnitude as to require balance chambers. Balance chambers are well known in the art and are identifiable as adjunct modules attached to a pipe elbow and fluidly in communication with the pressure inside the pipe elbow. The usual mode of construction in the prior art has included a dished-head cap attached to an adjacent pipe module through a bellows joint. More particularly, the dished-head cap was a curved section having a concave surface facing the pipe elbow. It has been found advantageous for reasons to be yet pointed out to reverse the orientation of the dished-head end cap so that the convex portion of the dished-head end cap substantially faces the pipe elbow.

OBJECT OF THE INVENTION

It is one object of the present invention to provide a cross-over construction which will decrease the maximum speed attained by a turbine rotor after a sudden and complete loss of load.

It is another object of the present invention to provide an improved cross-over construction which may be easily retrofitted to and improve the performance of operating machines in the field.

It is another object of the present invention to provide a cross-over construction which will decrease the space requirements needed for housing a large steam turbine.

The novel features believed characteristic of a present invention are set forth in the appended claims. The invention itself, however, together with further objects and advantages thereof, may best be understood with reference to the following description taken in connection with the drawings.

SUMMARY OF THE INVENTION

In a description of the invention as it applies to power plants, large steam turbines may be fluidly interconnected by cross-over conduits. These large steam carrying conduits are somewhat flexible in the axial direction and often require balance chambers to maintain their structural integrity. The present invention relates to an elbow type construction which uses a balance chamber defined in part by a dished-head end cap.

It is a fact that the maximum speed of a turbine rotor after a sudden and complete loss of load, is influenced by the amount of stored energy in the form of steam volume. It has been found advantageous, according to the invention, and a preferred embodiment to reduce the volume of stored steam by inverting or reversing the normal construction of the dished-head end cap which will result in a decrease in terminal speed under the conditions specified.

BRIEF DESCRIPTION OF THE DRAWINGS

The drawing is a cross section of a pipe elbow constructions showing a balance chamber and a dished-head end cap positioned in accordance with the present invention.

DETAILED DESCRIPTION OF THE INVENTION

The invention may be advantageously embodied in a steam conduit 11 a portion of which is shown in the drawing. The steam conduit may be used to connect a high pressure steam source with a steam turbine or it may be used to interconnect two steam turbine sections in a well known "cross-over" configuration. In a broader sense, the present invention may be effectively utilized and incorporated into any fluid conduit in combination with a rotating shaft machine wherein it is desirable to reduce stored energy downsteam from control valves.

Referring to the drawing which is a cross section view of an elbow connection 13 of the type normally used in cross-over conduits for steam turbines, a pipe elbow 15 has an inlet end 17 and a discharge end 19 in relation to the direction of steam flow indicated. The inlet end of the pipe elbow is formed with a flange 21 for connection with a steam turbine or some source of steam (not shown).

The discharge end 19 of the pipe elbow is connected with a straight pipe 23 by means of a bellows connection 25. The straight pipe 23 has a flange 27 at its discharge end for connection with additional fluid carrying piping. The pipe elbow 15 is also fitted with a liner or pipe member 29 coupled to the pipe elbow surface of greater arcuate extent or the long side surface by weldments 31 and 33.

The liner 29 is connected to and sealed by an end cap 35. The connection is made by means of a bellows joint 37. The end cap is in the form of a dished-head wherein the convex surface 39 of the end cap faces the long side surface of the pipe elbow. The pipe elbow 15 is formed with openings 41 (only one shown) which allow fluid to pass into a chamber 43. The end cap is formed with a dished-head construction in order to structurally withstand pressures applied within chamber 43.

The end cap 35 is also formed at one end with an annular flange 45. The conduit 23 downstream from the pipe elbow is formed with a second flange 47. These two flanges are connected with mating flange surfaces on an annular wrapper 49. Annular wrapper 49 is a structural member which envelopes the pipe elbow, liner and end cap and is formed with a cut out 51 to accommodate the pipe elbow 15 and also allow for movement between the pipe elbow and the annular wrapper. The end cap may include a sheet metal closure 53 to complete the design.

The elbow construction operates in the following manner. The purpose of the construction shown is to provide a conduit which may be allowed limited axial thermal expansion but where the structural integrity of the connection is maintained. The fluid pressure exerts a force on the dished-head end cap 35 which force is counter balanced by the structural annular wrapper. The annular wrapper transfers the pressure force to the straight pipe 23 which force is then counter balanced by some anchor.

One aspect of the invention lies in the orientation of the end cap 35. In the prior art, the end cap was oriented such that the dished-head convex surface 39 faced away from the pipe elbow and extended beyond the annular wrapper 49. In other words, the dished-head end cap was oriented in a direction opposite to that which is shown for the particular elbow connection and which position could be obtained by releasing the flange connection at 45 and then reassembling the end cap protruding beyond the annular wrapper. One immediate attribute of the present invention, as shown, is that it requires less space in its orientation and therefore is particularly useful in retro-fit and add-on applications.

In the turbomachine art, the main advantage to the present invention is that it reduces the volume of stored fluid which is available in the event of sudden and complete loss of load. Reflecting on the concept of maximum speed; i.e., the highest rotor velocity attained after loss of load has occurred, some critical factors which effect maximum speed are the control closing time and the volume of stored fluid downstream of the control valves. The present invention reduces the volume of stored fluid by reversing the dished-head end to be contained within the annular wrapper 39. It is readily apparent from the attached drawing that the volume saved is approximately twice the volume of the end cap. Under the usual conditions, this translates into about ten of fifteen percent of the total cross over volume and can reduce the terminal speed of the turbine rotor by approximately one-half percent.

While there has been shown what is considered to be the preferred embodiment of the present invention, other modifications may occur to those skilled in the art; and, it is intended to cover in the appended claims all such modifications as fall within the true spirit and scope of the invention. More specifically, while the invention has been illustrated in terms of a cross-over for a steam turbine, it would work equally as well with any other high energy gaseous fluid.

What is claimed is:

1. A pipe elbow connection for a fluid conduit comprising:
   a pipe elbow;
   a pipe connected to one end of said pipe elbow by means of a first bellows joint;
   a liner connected to said pipe elbow in fluid communication with said elbow;
   a dished-head end cap connected to said liner by means of a second bellows joint, said dished-head end cap substantially located within said liner; and,
   an annular wrapper positioned around said pipe elbow and said liner interconnecting the dished-head end cap with the pipe, said wrapper being movable with respect to said pipe elbow.

2. The pipe elbow connection recited in claim 1 wherein the dished-head end cap is located within said annular wrapper.

3. The pipe elbow connection recited in claim 1 wherein the dished-head end cap is located totally within the cylinder of the annular wrapper.

4. The pipe elbow connection recited in claim 1 wherein the dished-head end cap further includes a convex surface and a concave surface and wherein the convex surface of said dished-head is directed toward the pipe elbow.

* * * * *